US008888416B2

(12) United States Patent
Spivak (10) Patent No.: US 8,888,416 B2
(45) Date of Patent: Nov. 18, 2014

(54) METHOD AND SYSTEM FOR DRILL WITH INTERRUPTED FEED (75) Inventor: Boris Spivak, Los Angeles, CA (US)

(73) Assignee: U.S. Industrial Tool & Supply Company, Gardena, CA (US)

( * ) Notice: Subject to any disclaimer, the term of this patent is extended or adjusted under 35 U.S.C. 154(b) by 904 days.

(21) Appl. No.: 13/074,292

(22) Filed: Mar. 29, 2011

(65) Prior Publication Data

US 2012/0251255 A1 Oct. 4, 2012

(51) Int. Cl.
*B23Q 5/26* (2006.01)

(52) U.S. Cl.
CPC .............. *B23Q 5/261* (2013.01); *B23Q 5/266* (2013.01)
USPC ............................ 408/1 R; 408/130; 173/141

(58) Field of Classification Search
CPC .................................. B23Q 5/266; B23Q 5/32
USPC .............. 408/1 R, 17, 14, 130; 173/141, 152, 173/159, 161
See application file for complete search history.

(56) References Cited

U.S. PATENT DOCUMENTS

| | | | |
|---|---|---|---|
| 2,079,640 A | 5/1937 | Vickers et al. | |
| 4,329,092 A | 5/1982 | Ponitzsch et al. | |
| 4,440,529 A * | 4/1984 | Henslee et al. | 408/1 R |
| 4,453,868 A | 6/1984 | Winslow | |
| 4,867,617 A * | 9/1989 | Maass et al. | 408/17 |
| 5,062,745 A | 11/1991 | Eckman | |
| 5,088,171 A | 2/1992 | Suzuki | |
| 5,215,416 A | 6/1993 | Dessouky | |
| 5,222,844 A * | 6/1993 | Maass et al. | 408/17 |
| 5,328,302 A * | 7/1994 | Eckman | 408/17 |
| 5,533,842 A * | 7/1996 | Johnson et al. | 408/17 |
| 5,833,404 A * | 11/1998 | Johnson et al. | 408/130 |
| 6,637,986 B2 * | 10/2003 | Powell | 408/1 R |
| 2004/0101376 A1 * | 5/2004 | Shemeta | 408/130 |

* cited by examiner

*Primary Examiner* — Andrea Wellington
*Assistant Examiner* — Alan Snyder
(74) *Attorney, Agent, or Firm* — Fulwider Patton LLP (57) ABSTRACT

A control system for an air driven drill is described, wherein the control system is of the kind that provides a feed stroke to a drill bit. The system comprises an interrupt line so that compressed air fed to a feed chamber is also fed to a clamp chamber whereby the unbalanced force on the feed piston becomes balanced so as to stop the feed stroke. An adjustable frequency generator is provided to impose a pulsating pressure variation in an air pressure supply. During a feed stroke under which compressed air is fed to the feed chamber, air fed to the clamp chamber via the interrupt line is caused by the adjustable frequency generator to have a pulsating pressure, so that the feed stroke is caused to be stopped for a first period, then resumed for a second period, to provide a periodically interrupted feed stroke.

4 Claims, 6 Drawing Sheets

METHOD AND SYSTEM FOR DRILL WITH INTERRUPTED FEED

BACKGROUND

Drills driven by compressed air for high precision drilling in industries such as the aircraft industry are well known. A typical pneumatic drill system of this kind is exemplified in FIG. 1, generally indicated by the numeral 10. Features of such drill systems include a drill bit 12 mounted on a spindle. The spindle and drill bit are driven by an air motor 60 (FIGS. 2-5) in the drill system. Standard features also include a foot 55, which assists the user in clamping the drill system onto a workpiece 14. A clamp 16 is associated with the foot and is slidable through the foot, configured, as will be described in greater detail below, to clamp the foot, and hence the entire drill system 10, onto the workpiece 14 so that drilling may take place while the drill 12 is able to advance on an axis that is fixed in relation to the workpiece. The drill system 10 provides the user with a number of operating conditions. First, there is a standby condition in which the drill does not rotate, the clamp is deactivated, and the drill is not driven towards the workpiece. The standby condition is followed, upon activation by the user, by a clamp and feed mode, in which the clamp draws the workpiece up against the foot, the drill rotates and is drawn towards the workpiece in a feed action so that the drill may cut a hole in the workpiece. Upon completion of the feed stroke, the drill is automatically retracted away from the workpiece. Finally, retraction may be followed by a trigger lock condition.

One of the problems encountered by prior art drilling systems of the kind described is that, once the feed stroke commences, the system provides for a continuous feed stroke in which the drill travels without interruption from the standby position, then through the feed stroke, to a fully extended position, which is then followed by the retract stroke. This continuous feed action causes a continuous stream of metal shaving (or "chip") to be formed at the tip of the drill 12. This long stream of metal, if long enough, may have the tendency to become stuck in the hole formed by the drill, especially if the hole is deep. As the drill continues to rotate, the chip may become compressed by the drill bit against the sides of the hole, and may damage the hole by scoring the surface of the hole. In certain applications, such damage can be extremely undesirable, as forming the point of initiation of crack propagation and other problems.

The structure into which the present invention is inserted is a pneumatic drilling control system 20 that has features of a known drilling control system. These known features are described here with respect to FIGS. 1-5, while the novel features of the invention are described in the section below headed Detailed Description of the Preferred Embodiments and with reference to FIG. 6.

The major features of the known control system 20 include four valves for controlling the operation of the system, namely a trigger valve 22, a retract valve 24, a feed valve 26, and a motor switch valve 28. These four valves are connected to each other by air conduits whose configuration and function will be described in further detail below. The function of the air conduits is to direct compressed air, delivered to the control system 20 by a main air inlet 200, to various parts of the control system according to the "logic" of the control valves acting in combination with each other. An optional booster pump 30 may be provided for advantageously balancing forces applied by air pressures. A clamp and feed cylinder 32 is provided for converting the air signals from the valves into a sequence of drill actions including standby, clamping, feeding, and retracting.

Internal to the clamp and feed cylinder 32, two disc shaped pistons are provided, specifically a clamp piston 34 and a feed piston 38. Each piston applies force on the drill system via its own connected rod that extends outside the clamp and feed cylinder 32. Specifically, the clamp piston 34 is connected to a clamp rod 36. The feed piston 38 is connected to a feed rod 40. The clamp rod 36 is configured to slide in a bore within, and coaxially with, the feed rod 40. This configuration allows the clamp piston to slide independently of the feed piston under certain circumstances. The feed rod 40 is further connected to a foot 55 that is used to provide an opposing force to the clamp 16 during the clamping action, described below. A kinecheck 57 (or kinematic check) is attached to the foot 55. This element is a dashpot that acts to prevent the drill feed stroke from advancing too rapidly when the resistance encountered by the drill is unexpectedly reduced. The dashpot is also used to control the feed rate during the drilling cycle.

The presence of two pistons within the clamp and feed cylinder divides that cylinder into three chambers, namely the clamp chamber 42 whose volume is changed only by movement of the clamp piston 34; the feed chamber 44 whose volume is changed only by movement of the feed piston 38; and, the linking chamber 46 whose volume is changed by relative movement between the clamp piston 34 and the feed piston 38. The feed piston 38 defines a one way valve 48, permitting air to move from the feed chamber 44 into the linking chamber 46, but not in the opposite direction. Thus, once air is trapped in the linking chamber 46, the clamp piston and the feed piston are compelled to move in unison, as if joined together.

As can be seen in the Figures, the clamp and feed cylinder 32 is fed compressed air by three different air conduits whose function will be described. Each one of the three air conduits corresponds with, and feeds air to, or vents air from, a different one of the three air chambers 42, 44, 46 in the clamp and feed cylinder to provide a series of sequential movements by the two pistons that enables the clamp, feed, and retract strokes of the drilling system.

In addition to the foregoing mechanisms, the system includes a depth stop bleed 50, configured to be shut by a stop 52 on the end of the spindle sleeve 54 that moves in unison with the feed rod 40. The operation of these mechanisms will be described below.

Standby Condition

Turning now to the operation of the known drilling control system 20. The system is one which has a standby condition, whose configuration is exemplified in FIG. 2. (In the drawings, the presence of compressed air in a conduit is indicated by a dotted marking. The absence of air, or where venting of air is occurring is indicated by no dotted marking. As used herein, the term "air" when used alone is intended to mean compressed air.)

Figure 2:
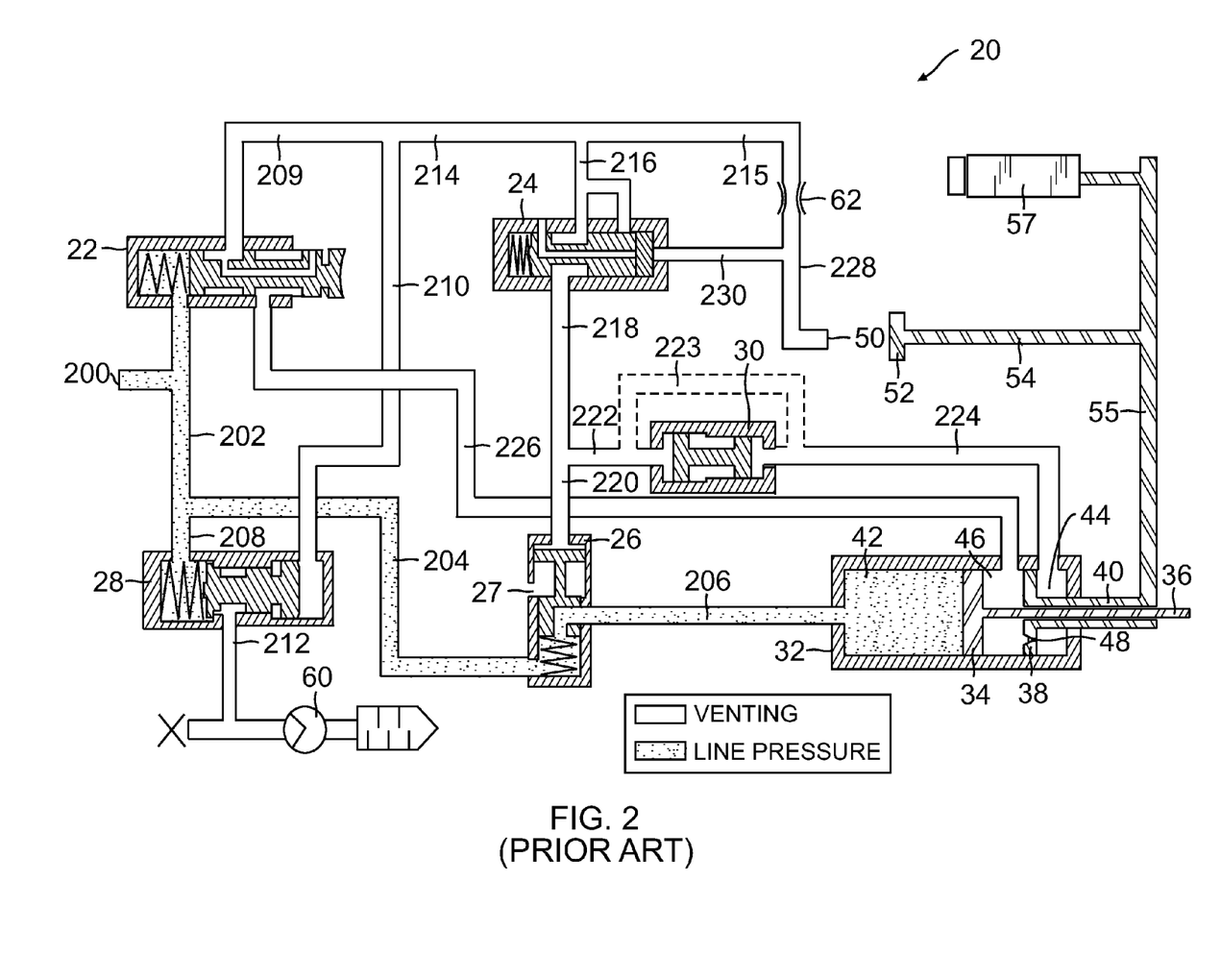
FIG. 2 is a schematic view of a control system known in the prior art, showing a standby mode.

Under this standby condition the trigger valve 22 is biased into an unactivated (i.e. closed) condition by a spring. Under this condition, the trigger valve diverts compressed air from the main air inlet 200, via the "clamp chamber line" (comprises conduits 202, 204, 206) into the clamp chamber 42 of the cylinder 32. In this embodiment, the feed valve 26 is positioned in the "clamp chamber line" between conduits 204 and 206. However, air entering the feed valve 26 via conduit 204 forces the feed valve to an open condition to permit unrestricted passage of air to the clamp chamber 42 as shown in FIG. 2

With compressed air in the clamp chamber 42 the clamp piston 34 is forced proximally in the cylinder 32 so that the clamp 16 (FIG. 1) is extended beyond the workpiece 14 without any clamping action taking place. Also, the clamp piston 34 and feed piston 38 are in equilibrium, in which condition they are not urged into further motion by any unbalanced force. The motor switch valve 28 is biased to a closed position by a spring. Thus, air is not passed through the motor switch valve to the air motor 60, and hence the drill is stationary.

Clamp and Feed Stroke Condition

The control system 20 has a clamp and feed stroke condition, that is explained with reference to FIG. 3. When the user of the control system wishes to cause the drill to be activated, by which to first clamp the workpiece then to advance the drill under a feed stroke, he depresses the trigger valve 22 against the bias of a spring. Due to the geometry of the piston shape within the cylinder of the trigger valve 22, air from the main air inlet 200 passes through the trigger valve 22 and is now sent to additional destinations by the conduit configuration.

Figure 3:
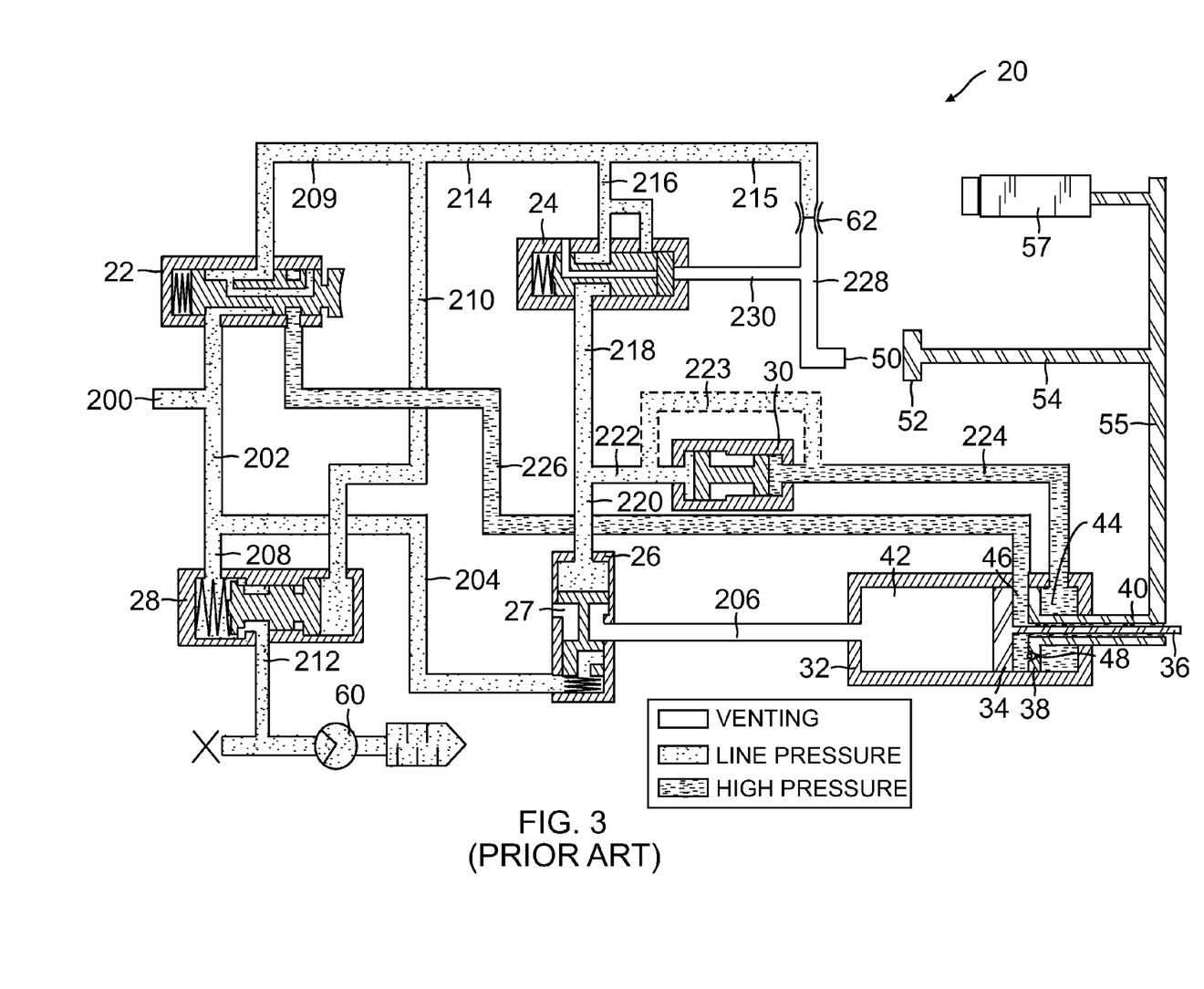
FIG. 3 is a schematic view of a control system known in the prior art, showing a clamp and feed mode.

As seen in FIG. 3, the first destination is via the "motor switch line" (comprises conduits 209, 210) to the motor switch valve 28. Air entering the motor switch valve causes it to open, thereby allowing air to pass from the main air inlet 200 via the "motor line" (comprises conduits 202, 208, and newly opened 212) to air motor 60. The air driven motor causes the drill to rotate.

The second destination is via the "restrictor line" (comprises conduits 209, 214, 215) to a restrictor 62, which is a restriction in the conduit system that allows air to slowly vent under low pressure through to atmosphere via a bleed hole 50.

The third destination is via the "retract valve line" (comprises conduits 209, 214, 216) to the retract valve 24. At this stage, the retract valve is biased to an open position by a spring. Due to the geometry of the piston within the retract valve 24, the air passes through the retract valve, and is directed to two sub-destinations by the conduit configuration.

The first sub-destination is, via conduits 218 and 220, to the feed valve 26, which is then forced by the air into a closed position as indicated in FIG. 3, cutting off air supply to conduit 206 of the clamp chamber line, and hence to the clamp chamber 42. Closing the feed valve 26 also vents air in the clamp chamber from a vent 27 in the feed valve 26.

The second sub-destination is to the feed chamber 44 via the "feed chamber line" (comprises conduits 218, 222, 224). Notably, en route to the feed chamber, the air may pass though an optional booster pump 30, whose function will be described below. From the feed chamber 44, the air passes via the one way valve 48 in the feed piston 38 into the linking chamber 46.

Figure 1:
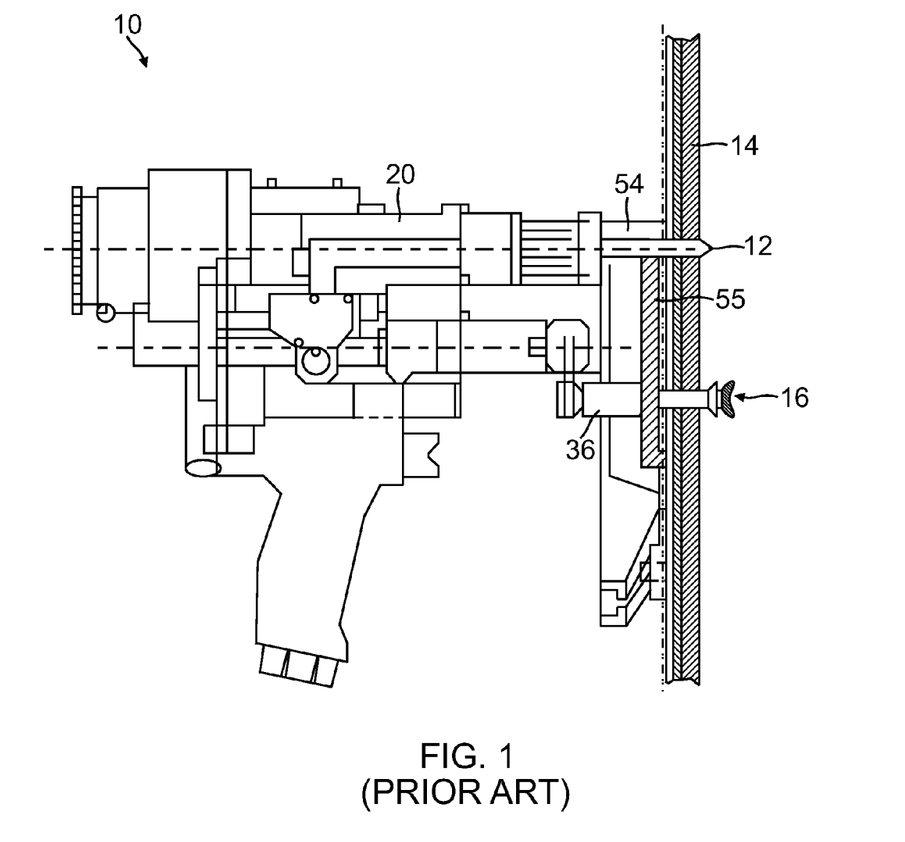
FIG. 1 is a schematic view of a drilling system into which the present invention is incorporated.

The pressure differential between the now ambient pressure clamp chamber 42 and the rapidly pressurizing link chamber 46 causes the clamp piston 38 to retract distally into the cylinder 32, thereby pulling the clamp rod 36 (and also the clamp 16) a short distance toward the foot 55, which in turn clamps the workpiece 14 onto the foot 55 (FIG. 1).

Once the clamp piston 34 has caused the workpiece to be securely clamped onto the foot, the clamp piston 34 and the feed piston 38 move together in unison while the workpiece is held securely against the foot. This movement in unison is due to the fact that air in the linking chamber 46 is balanced by air in the feed chamber 44. The air in the feed chamber 44, and the absence of air in the clamp chamber 42, causes a pressure differential force that moves the combined clamp piston 34 and feed piston 38 continuously and in unison toward the back end of the cylinder 32. This backward movement in unison of the combined clamp and feed cylinders is the feed stroke, in that, while holding the workpiece 14 in a clamped position against the foot 55, the movement also pulls the feed piston 38, and hence the foot 55 with the attached workpiece 14, backwards towards the drill 12 (FIG. 1). This allows the drill to advance in relation to the foot, and to cut a hole in the workpiece. (FIG. 1)

Retract Stroke Condition

Figure 4:
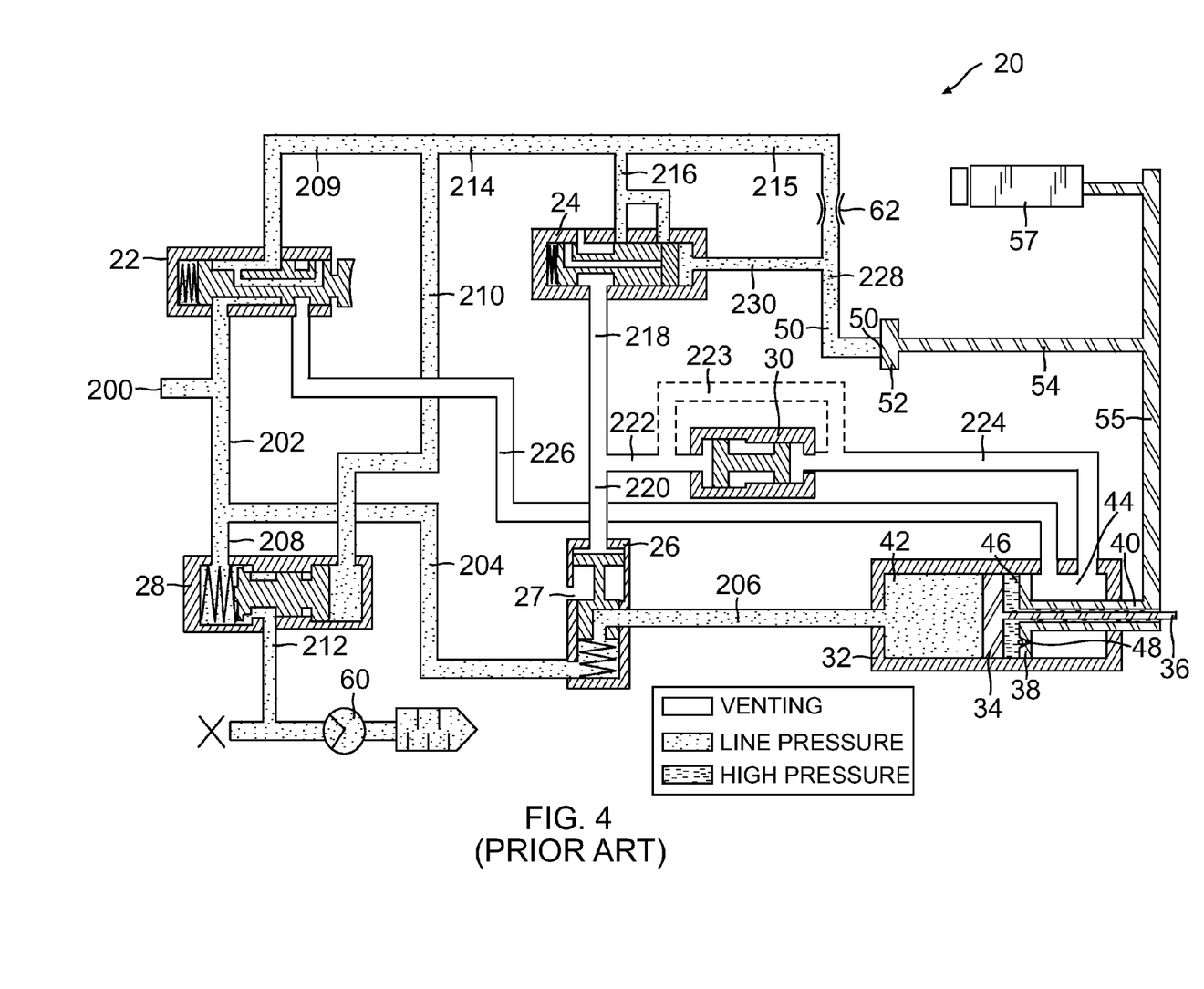
FIG. 4 is a schematic view of a control system known in the prior art, showing a retract mode.

Once the feed stroke is complete, the control system 20 has a retract stroke condition, that is explained with reference to FIG. 4. When the feed piston 38 reaches the end of its distal travel within the cylinder 32 as predetermined by the position of the depth stop 52, the depth stop 52 (connected to feed piston 38 via spindle sleeve 54 and feed rod 40) is configured to come into contact with the bleed hole 50 and seal it against the escape of air. The air leaking from the restrictor 62 rapidly builds up in the conduit 228, 230 which applies back pressure to the retract valve 24. When the back pressure in the retract valve reaches a critical level, the retract valve is forced to a closed condition, thereby shutting off the flow of air through the retract valve. This terminates air supply to the two sub-destinations described above. One, air to the feed chamber 44 that was flowing via conduits 218, 222 and 224 is shut off. Two, air that was flowing to the feed valve via conduits 218, 220 is shut off, creating a pressure differential across the feed valve 26 that causes it to open, thus allowing air from the main air inlet 200 to pass via conduits 202, 204, and 206 to the clamp chamber 42.

In this situation, the system is in a retract stroke condition. Air pressure in the clamp chamber 42, and the absence of air pressure in the feed chamber 44 causes a pressure differential that moves both the clamp piston 34 and the feed piston 38 in unison toward the front end of the cylinder 32. This motion causes the foot 55, with the workpiece 14 clamped to the foot, to move forwardly from the drill 12 and thus to withdraw the drill from the hole. Compressed air in the linking chamber 46 causes the clamp piston 34 and the feed piston 38 to move in unison during the retract stroke to the end of the retract stroke.

Figure 5:
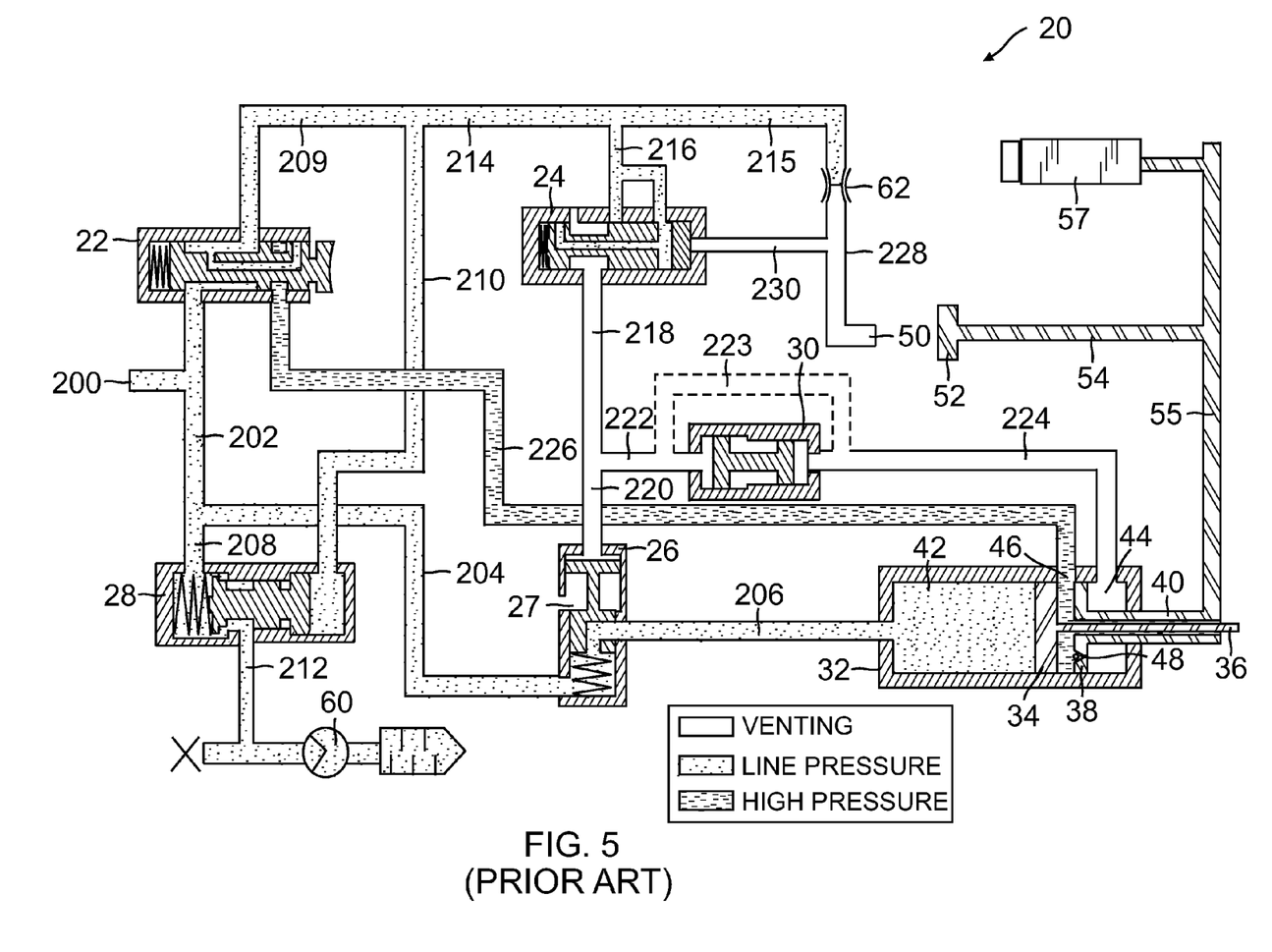
FIG. 5. is a schematic view of a control system known in the prior art, showing an end of retract, trigger lock mode.

As the retraction cycle commences, the depth stop 52 is removed from the bleed hole 50, thereby allowing air leaking from the restriction 62 to escape. This causes portion of the retract valve to reset. (FIG. 5)

The optional booster pump 30 may be utilized in the known controller 20 to balance pressure forces applied to the clamp piston 34 during the retract stroke. (FIG. 4) Specifically, the surface area of the proximal end of the clamp piston 34 is slightly smaller than the surface area of the distal end of the clamp piston, due to the presence of the clamp rod 36 attached to the proximal end. Thus, it will be appreciated, equal pressures in the clamp chamber 42 and the linking chamber 46 will cause the clamp piston 34 to slowly advance in relation to the feed piston 38, which in turn will cause the clamp to slowly disengage. This is undesirable during the retract stroke, when compressed air is present in both the clamp chamber 42 and the linking chamber 46. Accordingly, the booster pump 30 is provided to slightly elevate the pressure in the linking chamber compared with the pressure in the clamp chamber. (In the figures, the presence of this elevated pressure in the conduits is indicated by a heavier dotting marking.) The resulting pressure difference causes the clamp piston and the feed piston to be balanced by equal forces, and to move in unison during the retract stroke, and prevents the clamp from slowly disengaging from the foot. The booster pump 30 may also be utilized to increase both clamping and thrust forces while drilling tough materials.

Trigger Valve Lock Condition

The control system 20 has a trigger lock action that occurs at the end of the retract stroke, that is explained with reference to FIG. 5. When, during the retract stroke, the clamp piston 34 and the feed piston 38 have moved proximally in the cylinder 32 to the end of their travel, the linking chamber 46 terminates in a position that exposes the linking chamber 46 to the "trigger valve lock line" (comprising conduit 226). A small portion of air compressed in the linking chamber discharges into conduit 226, from where it travels to the trigger valve 22 and activates a lock on the trigger valve. In this locked open condition, the control system 20 is in a condition in which the air motor 60 receives air to rotate the drill, the drill is separated from the foot, and the clamp is disengaged. This lock remains in place until the user actively resets the trigger valve to the unactivated position, or standby condition (FIG. 2).

As noted, one of the problems encountered by a prior art drilling system 20 of the kind described above, is that, once the feed stroke commences, it provides for a continuous feed stroke in which the feed piston 38 travels without interruption from the proximal end of the cylinder 32 to the distal end. This continuous action causes a continuous stream of metal shaving (or "chip") to be formed at the tip of the drill. This long stream of metal, if long enough, may have the tendency to become stuck in the hole formed by the drill. As the drill continues to rotate, the chip may become compressed against the sides of the hole, and damage by scoring the surface of the hole. In certain applications, such damage can be extremely undesirable, as forming the point of initiation of crack propagation and other problems.

Thus, there is a need in the art for a system and method that will solve this kind of problem in continuous feed drill applications. There is a further need for such solutions to be capable of being retrofitted onto existing drill systems. The present invention addresses these and other needs.

SUMMARY OF THE INVENTION

The present invention relates to a control system for an air driven drill. The kind of control system to which the present invention is configured to be adapted includes a cylinder having a feed piston positioned inside the cylinder, such that the feed piston defines a feed chamber within the cylinder, the feed chamber having a volume that is varied only by movement of the feed piston. The cylinder also includes a clamp piston positioned inside the cylinder, such that the clamp piston defines a clamp chamber within the cylinder, the clamp chamber having a volume that is varied only by movement of the clamp piston. Under this configuration, the feed piston and the clamp piston define a linking chamber between them, and the feed piston defines a one way valve that permits air in the feed chamber to flow one way into the linkage chamber, whereby the feed piston and the clamp piston move in unison in the cylinder during a feed stroke. The control system also includes a feed chamber line configured to supply compressed air to the feed chamber, and thereby configured to create an unbalanced force on the feed piston for moving the feed piston and thereby for applying the feed stroke to the drill. Further, a clamp chamber line is configured to sequentially introduce compressed air into the clamp chamber, and to vent compressed air from the clamp chamber through a vent hole in a feed valve. With these elements of the known control system in place, the invention comprises additional features which are configured to provide an interrupted feed stroke to the drill.

The inventive aspect of the control system comprises an interrupt line that connects the feed chamber line to the clamp chamber line, so that compressed air fed via the feed chamber line to the feed chamber is also fed to the clamp chamber whereby the unbalanced force on the feed piston becomes balanced so as to stop the feed stroke. An adjustable frequency generator is positioned in the interrupt line and is configured to cause air flow downstream of the frequency generator to pulsate between a high pressure pulse and a low pressure pulse. Under this configuration of elements, during a feed stroke under which compressed air is fed to the feed chamber, compressed air fed to the clamp chamber via the interrupt line is caused by the adjustable frequency generator to pulsate, so that the feed stroke is caused to be stopped for a first period during a high pressure pulse, then resumed for a second period during a low pressure pulse, to cause a periodically interrupted feed stroke.

In a preferred aspect of the invention, the interrupt line includes a connecting conduit extending between the adjustable frequency generator and the vent hole in the feed valve, whereby the interrupt line is configured to feed compressed air to the clamp chamber via the vent hole in the feed valve. In another preferred aspect, an exhaust valve is connected to the vent hole in the feed valve, the exhaust valve being configured to direct air from the adjustable frequency generator into the clamp chamber during a high pressure pulse in the interrupt line, and being further configured to vent air from the clamp chamber during a low pressure pulse in the interrupt line. Further, the frequency generator is configured to permit a user to adjust the length of the first period of time, and also to permit a user to adjust the second period of time.

In another aspect, the invention includes a method of controlling an air driven drill. Under this aspect, the inventive method is applied to a known drill that has a control system of the kind that includes a cylinder having a feed piston positioned inside the cylinder, such that the feed piston defines a feed chamber within the cylinder, the feed chamber having a volume that is varied only by movement of the feed piston. The known control system also a clamp piston positioned inside the cylinder, such that the clamp piston defines a clamp chamber within the cylinder, the clamp chamber having a volume that is varied only by movement of the clamp piston. Under this configuration, the feed piston and the clamp piston define a linking chamber between them, and the feed piston defines a one way valve that permits air in the feed chamber to flow one way into the linkage chamber, whereby the feed piston and the clamp piston move in unison in the cylinder during a feed stroke. The known control system includes a feed chamber line configured to supply compressed air to the feed chamber, and thereby configured to create an unbalanced force on the feed piston for moving the feed piston and thereby for applying the feed stroke to the drill. The known control system also includes a clamp chamber line configured to sequentially introduce compressed air into the clamp chamber, and to vent compressed air from the clamp chamber through a vent hole in a feed valve.

The inventive method of the present invention comprises applying the following steps to control the system in a novel manner. While a constant air pressure is provided in the feed chamber to provide a feed stroke, a pulsating air pressure is provided in the clamp chamber to pulsatingly interrupt the feed stroke. In a preferred aspect, of the invention, providing a constant air pressure in the feed chamber while providing a pulsating air pressure in the clamp chamber includes connecting the feed chamber line to the clamp chamber line with an interrupt line, and causing the air transmitted in the interrupt line to pulsate between a high pressure pulse and a low pressure pulse. In a further aspect, the step of causing the air transmitted in the interrupt line to pulsate between a high pressure pulse and a low pressure pulse includes installing an adjustable frequency generator in the interrupt line.

The interruptions in the feed stroke caused by the different aspects of the invention have the advantageous result that streams of chip that may be formed by the drill tip are cut into shorter lengths when the feed of the drill is frequently interrupted. These smaller lengths are then ejected from the drilled hole by the spinning drill bit, and are less likely to become stuck in the hole to cause damage to the surface of the hole.

These and other advantages of the invention will become further apparent when read in conjunction with the drawings and the detailed description of the preferred embodiments.

DETAILED DESCRIPTION OF THE PREFERRED EMBODIMENTS

Figure 6:
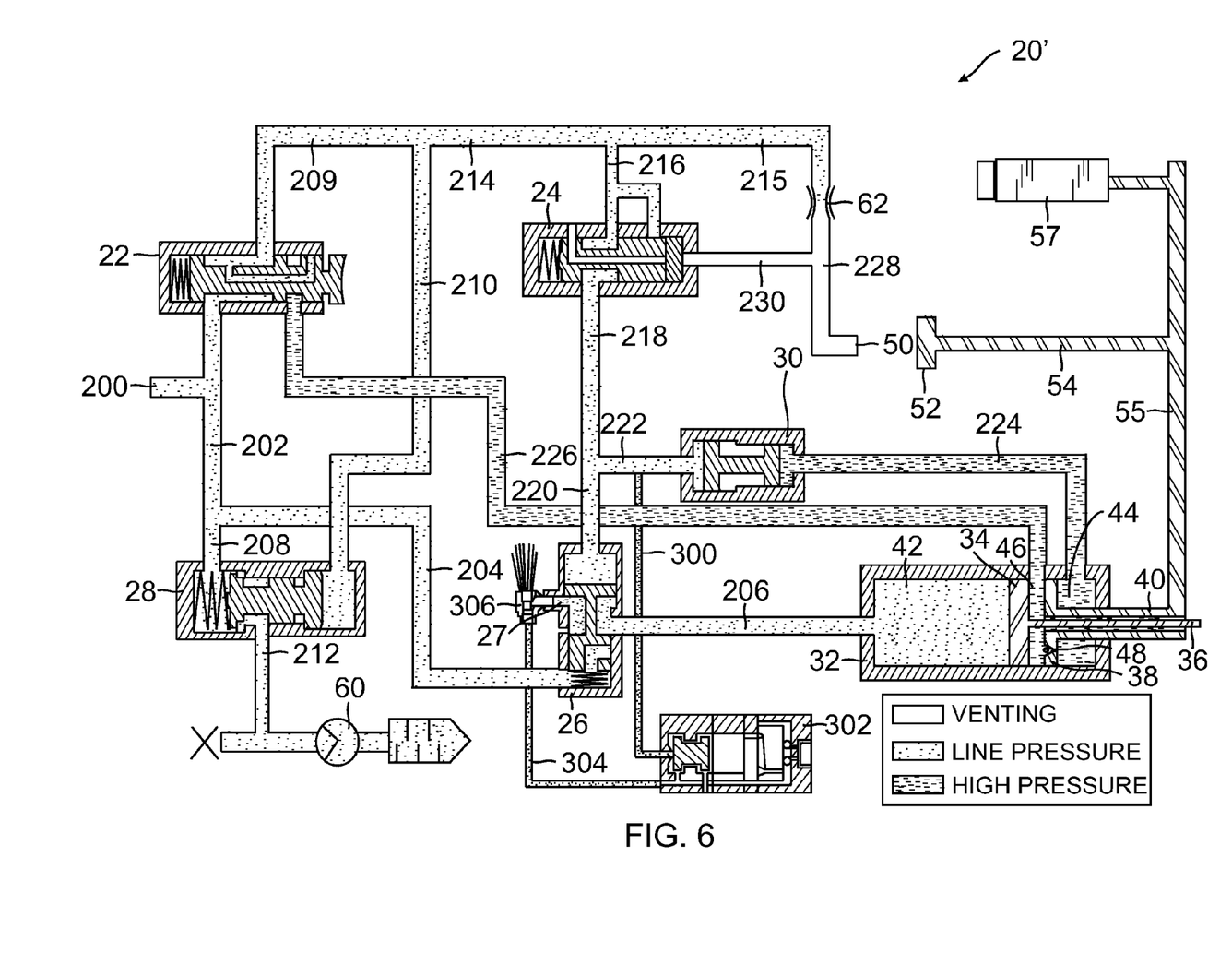
FIG. 6 is a schematic view of a control system having features of the present invention.

With reference now to FIG. 6, a preferred embodiment of the invention is described. Under a preferred embodiment, a modification is made to the known control system 20, resulting in the inventive control system generally indicated by the numeral 20' in FIG. 6. In one aspect of the invention, the modification may be made by retrofitting the modification into an existing control system 20, and in other aspect, the modification may be built into a control system at original manufacture.

Under both aspects, the invention provides for a controllable interruption of the feed stroke, so that the forward motion of the drill into the workpiece is periodically interrupted, without rotation of the drill being interrupted. This pause in the feed breaks any continuous chip that has formed, and allows the chip to be expelled from the hole before the drill continues with its forward feed stroke movement. Thus, a series of forward feed movements are provided, interrupted by a series of pauses which are timed to allow continuous chips to be broken and expelled from the hole. The resulting hole has a more perfect surface without the scoring and scratching that may occur in prior art drilling systems.

In order to achieve this advantageous result, and as explained with reference to FIG. 6, an "interrupt line" (comprising conduits 300, 304) is installed as a component of the controller system 20'.

To provide the interrupt line, the feed chamber line (comprising conduits 218, 222, 224) is tapped into. First, an additional tapping conduit 300 is installed to connect into the feed chamber line. As previously noted, the feed chamber line extends between the retract valve 24 and the feed chamber 44. The point of connection is before the booster pump 30 if a booster pump is provided. At the opposite end of the tapping conduit 300 an adjustable frequency generator 302 is installed. An adjustable frequency generator is a known device that is capable of providing a pulsating constriction on air pressure that has built up in a conduit behind the frequency generator 302. An example of a commercially available adjustable frequency generator is the Crouzet Adjustable Frequency Generator, Catalog No. 81506940, manufactured by Crouzet of 170 Technology Drive, Irvine, Calif. 92618, www.crouzet-usa.com. The described adjustable frequency generator has control means that allow a user to set a first period being the frequency at which each constriction on air pressure occurs, and a second period being the duration of each constriction.

Downstream of the adjustable frequency generator 302, a connection conduit 304 is provided that extends to and joins the frequency generator to the vent 27 in the feed valve 26. A quick exhaust valve 306 is provided that fits over the vent 27. The quick exhaust valve is configured with a toggle switch so that when a positive pressure is sensed in the connecting conduit 304, the quick exhaust valve 306 forces air passing through the interrupt line to pass directly through the feed valve 26, thence via conduit 206, and into the clamp chamber 42. However, when no positive pressure is sensed in the connecting conduit 304, air that has been directed to the clamp chamber 42 is vented from the clamp chamber 42 through the quick exhaust valve 306. A suitable quick exhaust valve for this purpose is obtainable from Clippard Instrument Laboratory, www.clippard.com, as part MEV-2, Poppet type quick exhaust valve.

Under this configuration, air from the feed chamber line (conduits 218, 222, 224), during a feed stroke condition, may be effectively fed into both the feed chamber 44 and via the interrupt line into the clamp chamber 42. It will be appreciated that when this happens, air in the front and at the back of the cylinder 32 will cause an equilibrium situation that causes the clamp piston 34 and feed piston 38 combination to stop moving in the cylinder 32. However, the adjustable frequency generator 302 causes air passing through the interrupt line to be constricted under a pulsating constriction, so that air is fed into the clamp chamber 42 via the frequency generator in a series of high and low pressure pulses: When air flows through the frequency generator under a high pressure pulse, the feed piston 38 is balanced by pressure front and back the cylinder, causing the feed piston to pause. When air is constricted from moving through the frequency generator during a low pressure pulse, then air flows into the feed chamber 44 but is prevented from moving into the clamp chamber 42, and any air in the clamp chamber is vented through quick exhaust valve 306. In this situation an unbalanced pressure force in the cylinder causes the feed piston 38 to resume moving backwards in the cylinder 32 unbalanced by any compressed air in the clamp chamber. Thus, the operation of the adjustable frequency generator 302 in the interruption line causes the feed stroke to experience a series of pauses, or interruptions, according to the period of pause, and period of interruption setting that the user has applied to the adjustable frequency generator 302.

Thus, with the interrupt line (conduits 302, 304) in place to feed air to both sides, front and back, of the cylinder 32 when the control system 20 has taken the drill 10 into the feed stroke, a pulsating constriction of pressure in the interrupt line is caused in the interrupt line by the adjustable frequency generator 302. Specifically, a pulsating or interrupted distal movement of the feed piston 38 arises according to the frequency of pressure reduction that has been set on the pulse generator 302. This pulsating movement translates into a pulsating or interrupted feed movement of the rotating drill 12 (FIG. 1) towards the workpiece 14 while allowing the drill to continue to rotate, and solves the problem identified above because any long chip that may have formed is cut into shorter lengths that are expelled by the rotating drill 12.

Thus, there is described an advantageous and novel solution to a problem encountered in the prior art that greatly improves the quality of holes drilled by an air driven drilling system. The present invention may, of course, be carried out in other specific ways than those herein set forth without departing from the essential characteristics of the invention. The present embodiments are, therefore, to be considered in all respects as illustrative and not restrictive, while the scope of the invention is set forth in the claims that follow.

I claim:

1. A control system for an air driven drill, wherein the control system is of the kind that includes,
   a cylinder having a feed piston positioned inside the cylinder, such that the feed piston defines a feed chamber within the cylinder, the feed chamber having a volume that is varied only by movement of the feed piston,
   a clamp piston positioned inside the cylinder, such that the clamp piston defines a clamp chamber within the cylinder, the clamp chamber having a volume that is varied only by movement of the clamp piston,
   wherein the feed piston and the clamp piston define a linking chamber between them, and the feed piston defines a one way valve that permits air in the feed chamber to flow one way into the linkage chamber, whereby the feed piston and the clamp piston move in unison in the cylinder during a feed stroke;
   a feed chamber line configured to supply compressed air to the feed chamber, and thereby configured to create an unbalanced force on the feed piston for moving the feed piston and thereby for applying the feed stroke to the drill,
   a clamp chamber line configured to sequentially introduce compressed air into the clamp chamber, and to vent compressed air from the clamp chamber through a vent hole in a feed valve;
   the control system being characterized in that it further comprises:
      an interrupt line that connects the feed chamber line to the clamp chamber line, so that compressed air fed via the feed chamber line to the feed chamber is also fed to the clamp chamber whereby the unbalanced force on the feed piston becomes balanced so as to stop the feed stroke;
      an adjustable frequency generator positioned in the interrupt line and configured to cause air flow downstream of the frequency generator to pulsate between a high pressure pulse and a low pressure pulse;
      whereby, during a feed stroke under which compressed air is fed to the feed chamber, compressed air fed to the clamp chamber via the interrupt line is caused by the adjustable frequency generator to pulsate, so that the feed stroke is caused to be stopped for a first period during a high pressure pulse, then resumed for a second period during a low pressure pulse, to cause a periodically interrupted feed stroke;
   wherein the interrupt line includes a connecting conduit extending between the adjustable frequency generator and the vent hole in the feed valve, whereby the interrupt line is configured to feed compressed air to the clamp chamber via the vent hole in the feed valve.

2. The control system of claim 1, further including an exhaust valve connected to the vent hole in the feed valve, the exhaust valve being configured to direct air from the adjustable frequency generator into the clamp chamber during a high pressure pulse in the interrupt line, and being further configured to vent air from the clamp chamber during a low pressure pulse in the interrupt line.

3. The control system of claim 1, wherein the frequency generator is configured to permit a user to adjust the length of the first period of time.

4. The control system of claim 3, wherein the frequency generator is further configured to permit a user to adjust the second period of time.

* * * * *